United States Patent Office 2,758,338
Patented Aug. 14, 1956

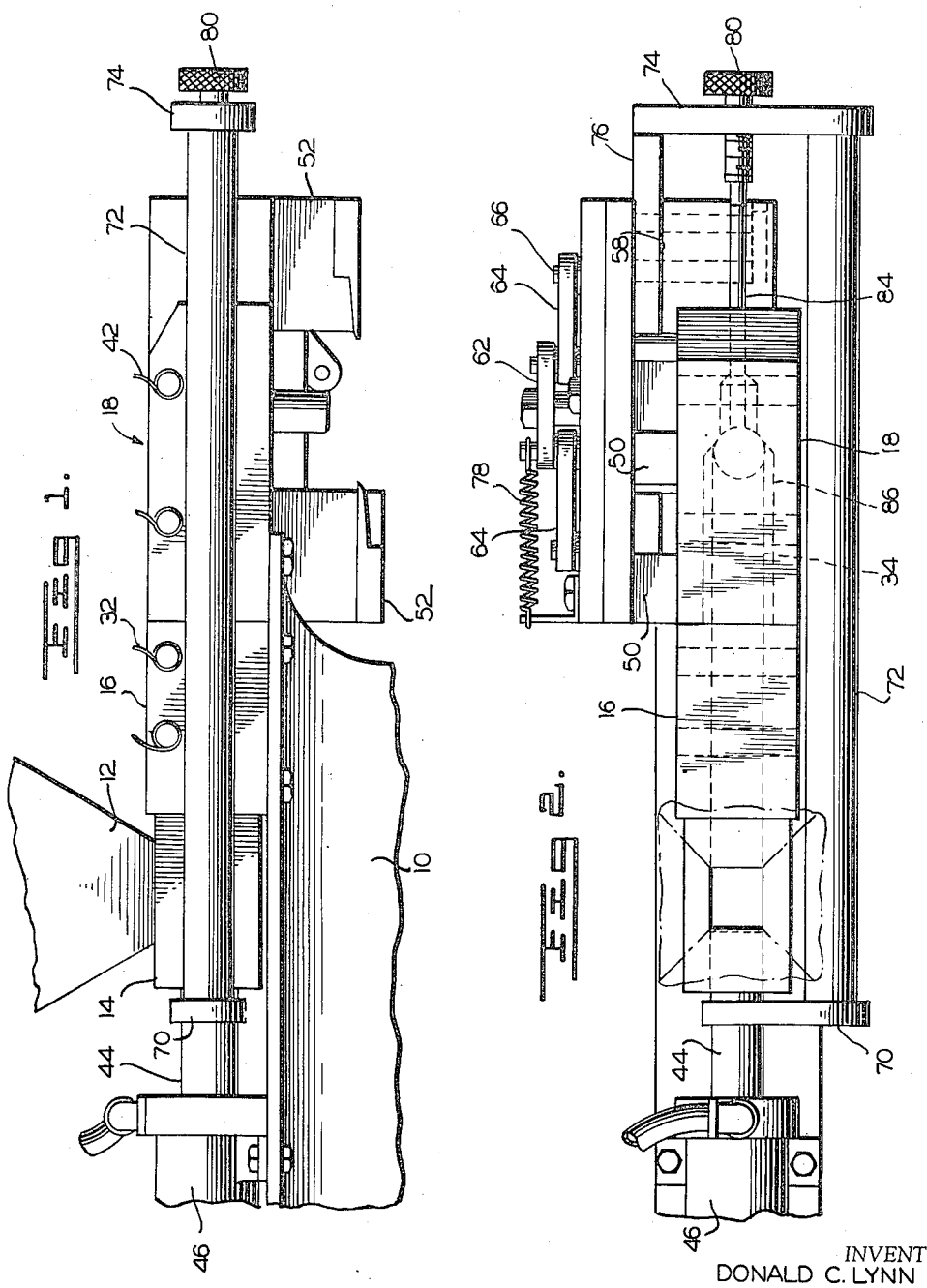

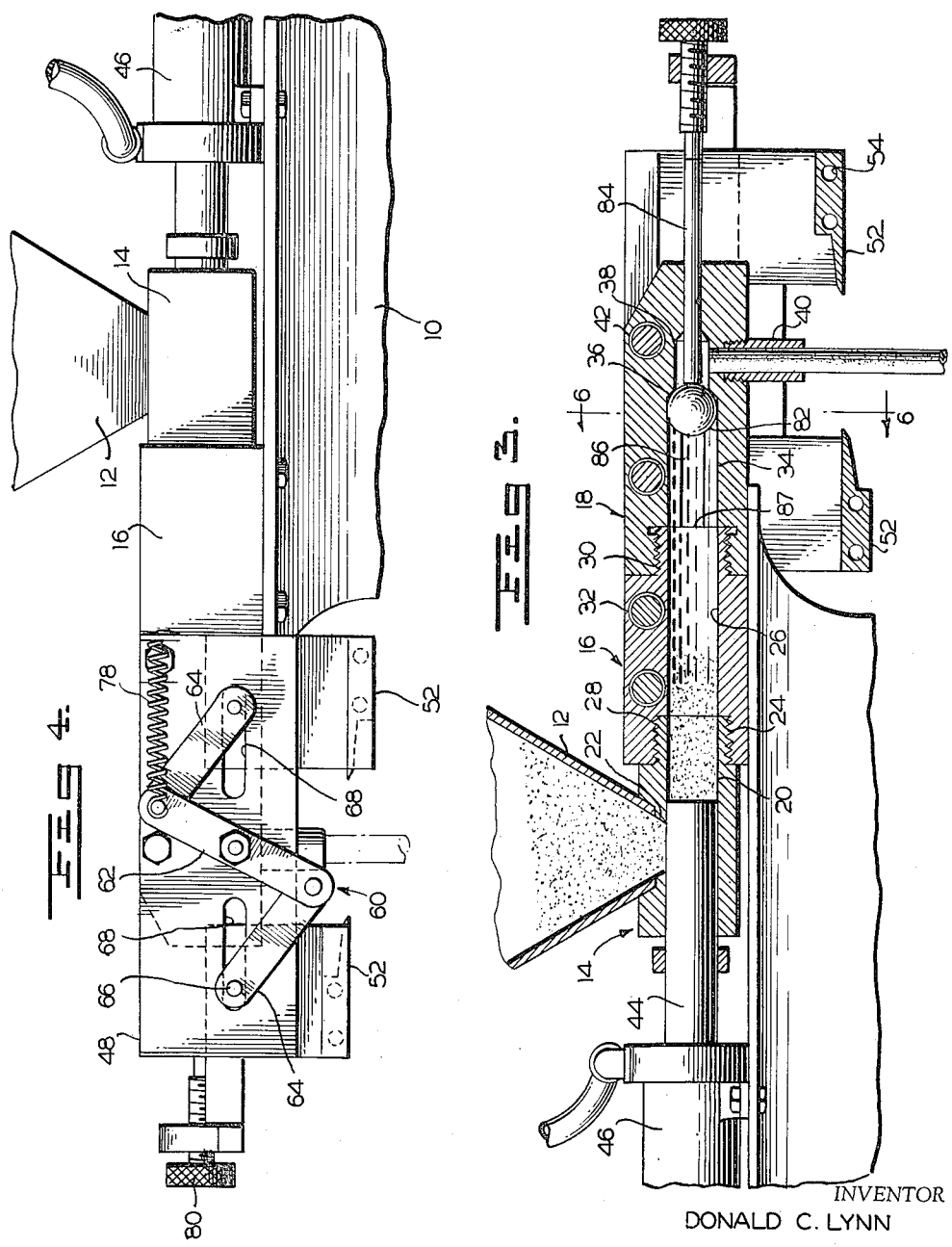

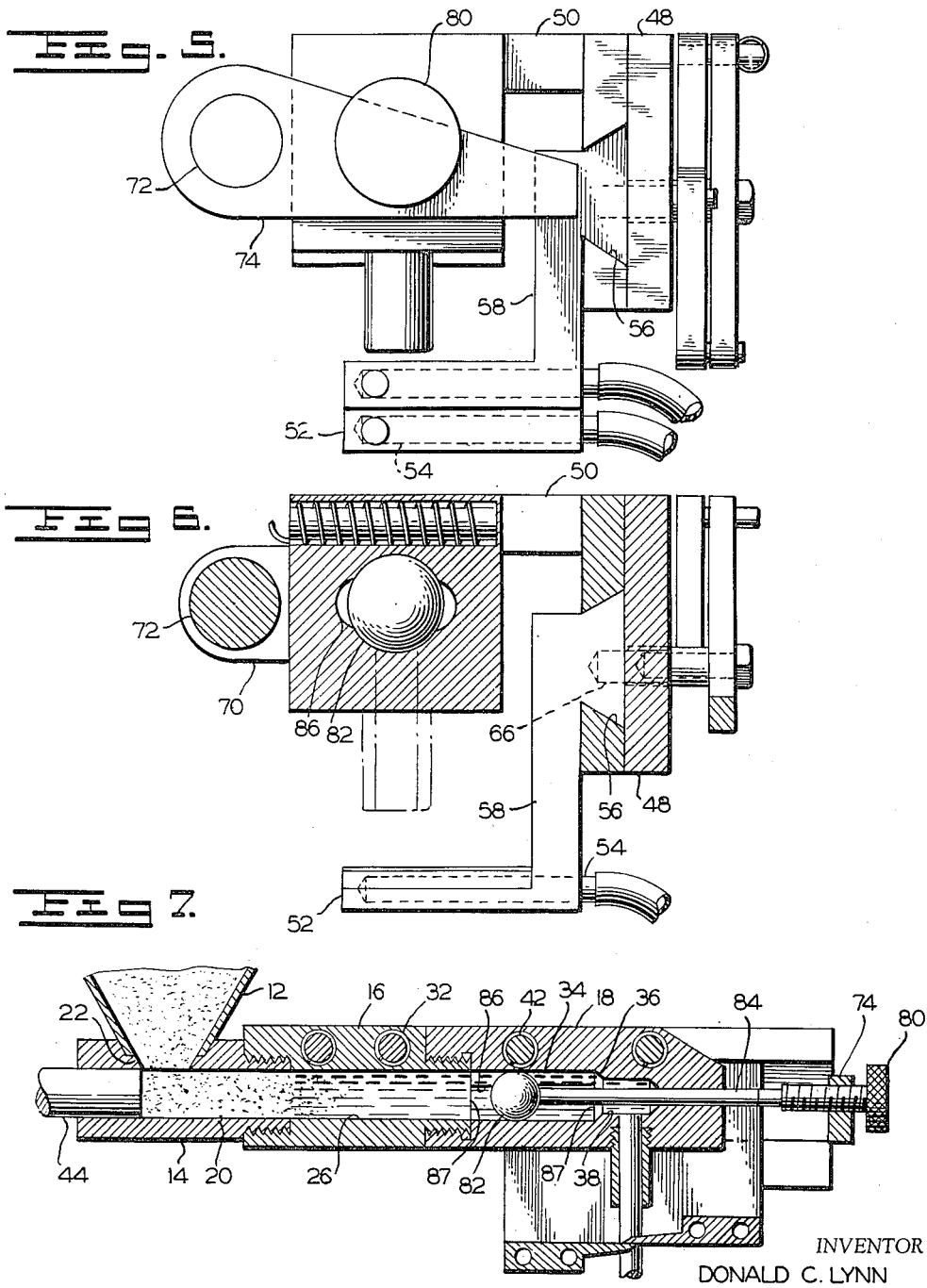

2,758,338

PLASTIC MEASURING DEVICE

Donald C. Lynn, Los Angeles, Calif., assignor, by mesne assignments, to Crown Cork & Seal Company, Inc., Baltimore, Md., a corporation of New York Application April 2, 1952, Serial No. 280,110

20 Claims. (Cl. 18—30)

The present invention relates to a plasticizing device and more particularly to a plasticizing device capable of delivering successive measured charges of plastic material to a mold or molds.

In the process of manufacturing articles made of plastic material, it is necessary to take the raw granular thermoplastic material and first plasticize it by heating or the like at a predetermined temperature. After the material has been plasticized and is in a viscous liquid state, it is then necessary to transfer the viscous plasticized mass to a mold to be molded into any desired shape or configuration. Since it is necessary that only a charge of the material sufficient to fill a mold be placed in the mold, I have developed a means to accurately control the amount of plasticized mass supplied to the mold.

Therefore, it is an object of this invention to provide a plasticizing device which will not only plasticize the granular thermoplastic material into a viscous liquid state but will also dispense measured charges of the plasticized material into a mold.

Another object of this invention is to provide a plasticizing device which can be easily manufactured at a minimum cost.

A further object of the invention is to provide a plasticizing device which has a minimum of moving parts, but will still dispense a measured charge. By having a minimum of moving parts, the plasticizing device is less likely to clog and jam and maintenance troubles will be reduced to a minimum.

A still further object of the invention is to provide a plasticizing device with means for delivering a measured charge that can be adjusted to a predetermined desired amount. By providing an adjustment on the measuring device, the utility of the machine is increased as it may be used for supplying pastic material in different quantities to molds of various sizes.

An additional object of the invention is to provide a plastic measuring device with cutters that are adapted to cut a measured slug of the plastic material dispensed from the plasticizing device. The cutters must have a close tolerance and therefore must be cooled so that the plastic material will not adhere thereto.

These and other objects of the invention will appear more clearly in the specification, claims and the accompanying drawings in which:

Figure 1 is a front elevational view of the device;

Figure 2 is a plan view of Figure 1;

Figure 3 is a cross sectional view of Figure 1 showing a measured slug being dispensed from the device;

Figure 4 is an elevation of the device looking from the rear showing in detail the linkage of the cutter mechanism;

Figure 5 is an end elevation of Figure 1 looking from the right;

Figure 6 is a cross section on the line 6—6 of Figure 3; and

Figure 7 is a partial cross sectional view similar to Figure 3 showing the valve being moved to the open position and the cutter mechanism cutting off a measured slug of plastic material.

Referring specifically to the drawings, wherein like character or reference numerals represent like or similar parts, the plasticizing device, which may be mounted on a table or frame 10, is comprised of a hopper 12 for storage of granular thermoplastic material, a cylinder 14 attached to said hopper for receiving the granular thermoplastic material therefrom, a plasticizing cylinder 16 and a measuring cylinder 18. The granular material is supplied from the hopper 12 to the granular material cylinder 14 and then is transferred to the plasticizing cylinder 16 where it is plasticized by heating at a predetermined temperature. After the material has plasticized to form a plasticized mass, it is then further transferred into the measuring cylinder 18 from which it is successively dispensed in measured charges. The measured charges are then cut off into "slugs" and placed into molds, not shown, to be formed into plastic articles.

As shown in Figures 1, 2 and 3, a hopper 12 is mounted on a granular material cylinder 14 in such a manner that the granular thermoplastic material in the hopper may be supplied continuously by gravity to the granular material cylinder. Granular material cylinder 14 has a chamber or bore 20 longitudinally extending throughout its length for receiving the granular thermoplastic material from the hopper. A transverse inlet 22 to chamber 20 is provided in the upper wall of the cylinder for receiving granular material from the hopper. At the end adjacent the outlet of the chamber, the granular material cylinder is provided with a male threaded portion 24 so that it may be attached to the plasticizing cylinder 16.

Plasticizing cylinder 16 is provided with a circular bore or chamber 26 throughout its longitudinal length of substantially the same diameter as the bore or chamber 20 in granular material cylinder 14. A female fitting or threaded portion 28 is provided at one end thereof for cooperation with the fitting 24 on granular material cylinder 14, while a male fitting 30 is provided at the other end thereof for attaching the measuring cylinder 18 thereto. Heating elements 32 are provided throughout the periphery of plasticizing cylinder 16 so that the chamber therein may be heated and the material passing therethrough plasticized. As shown in the drawings, heating elements 32 are of the electrical resistance coil type as they are the best for maintaining an accurate control of temperature in the chamber 26 but it is obvious that other means could be used to heat the chamber.

Attached to an end of plasticizing cylinder 16 is a measuring cylinder 18 having a measuring chamber 34 therein. For convenience, measuring cylinder 18 may be attached to plasticizing cylinder 16 as previously explained, by merely threading it on to male fixture 30 of the plasticizing cylinder. Measuring cylinder 18 has a cylindrical bore 34 longitudinally extending therein which defines a measuring chamber. At the internal end of cylindrical bore 34, is a tapered valve seat 36 which will be described in more detail later in the specification. Chamber or cylindrical bore 34 has an outlet passage 38 adjacent the tapered seat 36 of smaller diameter than said chamber. Outlet passage 38 is then provided with a discharge nozzle or nipple 40 extending transversely of the chamber. As shown at 42, measuring cylinder 18 is also provided with heating elements so the plasticized mass can be maintained at a temperature which will keep it viscous.

A ram 44 which reciprocates into and out of the granular material cylinder 14 is provided at one end of the plasticizing device. Ram 44 may be operated by a hydraulic cylinder 46 or the like, so that it can reciprocate into and out of chamber 20 in granular material cylinder 14 and it is used for transferring the granular material in the granular material cylinder to the chamber 26 in plasticizing cylinder 16. As will be evident later in the specification, the movement of granulated thermoplastic material into plasticizing chamber 16 will also move the previously plasticized material into measuring chamber 34 of measuring cylinder 18.

As shown in Figures 4, 5 and 6, a cutter blade carrier member 48 is attached to measuring cylinder 18 by as small an area as possible as shown at 50 so that the heat from the measuring cylinder will not be transferred to the cutter blades. It is important that cutter blades 52 are not heated by measuring cylinder 18 because they must have a close tolerance and further they must be clean of the plasticized material in order that they function properly. Therefore, in addition to mounting carrier member 48 in such a manner that heat is not transferred from the measuring cylinder 18 to cutter blades 52, the cutter blades are also water cooled by providing them with passages 54 which are connected by tubes to a suitable water supply.

Cutter carrier member 48 has a longitudinal dove-tail groove 56 in which each of the cutter blade holders 58 are adapted to reciprocate. As is clearly shown in Figures 5 and 6, cutter blades 52 are attached to holder members 58 and are adapted to be reciprocated with respect to each other by a reverse motion linkage mechanism 60. Reverse motion linkage mechanism 60 consists of a link 62 pivoted to cutter blade carrier member 48 at its medial point and at each end of said link are provided pivotal arms 64 which are respectively connected to cutter blade holders 58 by means of the pins 66 which operate in the slots 68 of carrier member 48.

As shown in Figure 2, cutter blades 52 are operated by means of the reciprocating ram 44, which as previously described is also used to transfer the material through the plasticizing device. Rigidly connected to the reciprocating ram 44 is the arm 70 which is connected in turn to a longitudinal rod member 72. At the far end of longitudinal rod member 72, another arm or plate 74 is fastened normal to said rod and in turn will cause cutters 52 to perform their cutting operation. Arm 74 will bear against a projection 76 on one of the cutter blade holders 58 on the return stroke of ram 44 thus causing the cutter blades to operate. As previously described, the reverse-motion linkage mechanism 60 will constantly operate the other cutter blade so that a cutting operation is obtained. The cutter blades will be returned to their non-operating position by means of the spring 78 attached to reverse-motion linkage 60.

Also carried by the arm 74 is an adjustment screw 80 for adjusting the open position of the valve element 82. The adjustment screw 80 carried by the arm 74 on the return stroke of the ram will contact a pin member 84 which is slidably mounted in measuring cylinder 18 so that said pin member will unseat valve element 82 and move it to a predetermined open position. It is necessary that the movement of valve element 82 be controlled as this movement determines the amount or quantity of the plasticized charge to be dispensed.

Within chamber 34 of measuring cylinder 18, the valve element 82 is adapted to reciprocate from an open to a closed position in a confined path defined by the walls of the chamber. Valve element 82, in this particular embodiment of the invention, is a spherical ball. However, it is obvious that the valve element could be a cylinder or the like so long as it is light enough to be carried by the flow of material through chamber 34. A ball type valve element is preferred because it is the lightest type of element and offers less resistance to being moved by the viscous plasticized mass flowing through the measuring chamber. As will be noted in Figure 6, longitudinal passages or grooves 86 are provided in the wall of measuring chamber 34 so that the plasticizing mass may pass valve element 82 when the valve element is being moved from the closed to the opened position. Grooves 86 allow the plasticized mass to fill the measuring chamber so that a measured charge will be dispensed when the reciprocating ram is again moved into the granular material chamber. It is well to note that the passages 86 are terminated at each end thereof by the transverse walls 87 which extend to the chamber 34.

As will now be understood from the foregoing description, in the operation of the device, the granulated thermoplastic material is supplied from the hopper 12 to granular material cylinder 14 by gravity through an inlet therein, and is then transferred from said cylinder to the plasticizing and measuring cylinders respectively by means of reciprocating ram 44. Once the granulated material is transferred to the plasticizing chamber and a plasticized mass is formed due to the heat of said chamber, the plasticizing apparatus is ready for continuous operation to dispense successive measured charges. As ram 44 moves into the granular material chamber 20, it will transfer granular material, as previously stated, to plasticizing chamber 26, but in the meantime, the plasticized material already in the plasticizing chamber will in turn flow through measuring chamber 34. As the plasticized material flows through the measuring chamber it will carry with it valve element 82, because of the viscous properties of the flow, to a position where the valve element is seated on valve seat 36. Valve element 82 will in turn force a measured charge of the plasticized mass out of the outlet 38 and such a charge will be equal in volume to area of the measuring cylinder and the distance the valve element has traveled. On the return stroke of ram 44, two operations will simultaneously occur. The cutter blades 52 will be reciprocated by means of arm 74 pressing against projection 76 on cutter blade holder 58 and, in addition, the adjustment screw 80 will contact pin member 84, longitudinally mounted in the measuring chamber, and said pin member will in turn return the valve element from the closed position to a predetermined open position. As valve element 82 is being carried to its open position by means of the pin, the viscous plasticized mass which is in the plasticizing and measuring chambers will be able to pass around the ball because of the longitudinal grooves 86 provided in the walls of measuring chamber 34.

If it is desired that a different quantity of plasticized material be distributed from said measuring chamber, it is only necessary to adjust the adjustment screw so that the length of the stroke of the pin is changed. By providing this adjustment, the utility of the plasticizing apparatus is increased so that the device may be used to dispense different quantities of plasticized material for molds of various sizes.

The terminology used in this specification is for the purpose of description and not for limitation, as the scope of the invention is defined by the claims.

I claim:

1. A measuring device for dispensing a measured charge of a plasticized mass comprising in combination a cylinder having a measuring chamber therein, said chamber having an inlet for delivery of the plasticized mass and an outlet for dispensing a measured charge of said mass, means for delivering the plasticized mass under pressure through said inlet to said chamber, valve means in said chamber adapted to close off said outlet after a measured charge of said mass has been dispensed, said valve means actuating to a closed position by flow of said plasticized mass in said chamber, and means operable by said first named means for opening said valve means a predetermined distance so that the plasticized mass can fill said measuring chamber.

2. A measuring device for dispensing a measured charge of a plasticized mass comprising in combination a cylinder having a measuring chamber therein, an inlet in said chamber for the delivery of the plasticized mass and an outlet for dispensing a measured charge of said mass, means for delivering the plasticized mass under pressure through said inlet to said chamber, valve means in said chamber adapted to close said outlet after a measured charge of said mass has been dispensed, said valve means including a valve seat adjacent said outlet and a reciprocal valve element in said chamber, said valve element movable to a closed position on said seat by flow of the plasticized mass through said chamber and means operable by said first named means for moving said valve element off of said seat a predetermined distance so the plasticized mass can fill said measuring chamber.

3. A measuring device for dispensing a measured charge of a plasticized mass comprising in combination a cylinder having a measuring chamber therein, said chamber having an inlet for delivery of the plasticized mass and an outlet for dispensing a measured charge of said mass, means for delivering the plasticized mass under pressure through said inlet to said chamber, valve means operable in said chamber to close said outlet when a measured charge of said mass has been dispensed, said valve means including a valve seat at one end of said chamber adjacent said outlet and a spherical valve element reciprocal in said chamber in a confined path defined by the walls of said chamber, said valve element movable to a closed position on said seat by flow of the plasticized mass through said chamber, means in said chamber for permitting the flow of the plasticized mass by said valve element when the valve element is moved to an open position, and means operable by said first named means for moving said valve element off of said seat a predetermined distance so the plasticized mass can fill said measuring chamber.

4. A measuring device of the type described in claim 3 wherein said means for permitting the flow of plasticized mass by said valve element when said valve element is moved to the open position includes a plurality of longitudinal grooves in the walls of said measuring chamber extending the length thereof from the inlet to the valve seat in said outlet.

5. A measuring device of the type described in claim 3 wherein said means operable by said first named means for moving said valve element off of said seat a predetermined distance so that the plasticized mass can fill said measuring chamber includes a pin element reciprocating into said chamber to engage and unseat said valve element a predetermined distance from said valve seat.

6. A measuring device of the type described in claim 5 wherein means are provided to vary the stroke of said pin element into said measuring chamber.

7. A measuring device of the type described in claim 3 wherein said means for permitting the flow of the plasticized mass by said valve element when the valve element is moved to an open position includes a passage between the wall of said chamber and said valve element.

8. In a plasticizing apparatus for dispensing a measured charge of a plasticized mass comprising in combination a hopper for a supply of granular thermoplastic material, a granular material cylinder connected to said hopper and having a chamber therein, a plasticizing cylinder connected to said granular material cylinder and having a heating chamber therein, a measuring cylinder connected to said plasticizing cylinder and having a measuring chamber therein, means to transfer the granular thermoplastic material to said plasticizing and measuring cylinders, valve means in said measuring cylinder responsive to the flow of said plasticized mass to stop the flow of the plasticized mass therefrom when a measured charge has been dispensed, and means operable by said first named means for opening said valve means a predetermined distance from the closed position so that the plasticized mass can fill said measuring chamber.

9. In a plasticizing device of the type described in claim 8 wherein said means to transfer the granular thermoplastic material is a reciprocating ram movable within the chamber of said granular material cylinder.

10. In a plasticizing apparatus for dispensing a measured charge of a plasticized mass comprising in combination a hopper for a supply of granular thermoplastic material, a granular material cylinder connected to said hopper and having a chamber therein, a plasticizing cylinder connected to said granular material cylinder and having a heating chamber therein, a measuring cylinder connected to said plasticizing cylinder and having a measuring chamber therein with an outlet at one end thereof, a reciprocating ram adapted to move into and out of the chamber of said granular material cylinder whereby the material therein is transferred to the plasticizing cylinder and is then flowed through said measuring cylinder, a valve seat in one end of the chamber of said measuring cylinder adjacent said outlet and a valve for cooperating therewith, said valve movable to a closed position on said seat by the flow of the plasticized mass through said measuring cylinder and opened to a predetermined position by means connected to said reciprocating ram, and means operable by said ram for cutting off the measured charge of said plasticized mass dispensed through said outlet.

11. In a plasticizing apparatus of the type described in claim 10 wherein said last named means is cooled thereby eliminating the adhesion of the plasticized mass thereto.

12. In a plasticizing apparatus of the type described in claim 10, including adjustment means to vary the movement of said valve in said measuring cylinder.

13. In a plasticizing apparatus for dispensing a measured charge of a plasticized mass comprising in combination a hopper for a supply of granular thermoplastic material, a granular material cylinder connected to said hopper and having a chamber therein, a plasticizing cylinder connected to said granular material cylinder and having a heating chamber therein, a measuring cylinder connected to said plasticizing cylinder and having a chamber therein with an outlet at one end thereof, a reciprocating ram adapted to move into and out of the chamber of said granular material cylinder whereby material therein is transferred to the plasticizing cylinder and is then flowed through said measuring cylinder, valve means operable in said measuring chamber to close said outlet when a measured charge of said mass has been dispensed, said valve means including a valve seat at one end of said measuring chamber adjacent said outlet and a spherical valve element reciprocal in said measuring chamber in a confined path defined by the walls of said measuring chamber, said valve element movable to a closed position on said seat by flow of the plasticized mass through said measuring chamber, means in said measuring chamber for permitting flow of the plasticized mass by said valve element when the valve element is moved to an open position, and means operable by said reciprocating ram for moving said valve element off of said seat a predetermined distance whereby the plasticized mass can fill said measuring chamber.

14. In a plasticizing apparatus of the type described in claim 13 including means operable by said reciprocating ram to cut the measured charge dispensed from said measuring cylinder, said means being cooled thereby eliminating the adhesion of the plasticized mass thereto.

15. In a plasticizing apparatus of the type described in claim 13 including means to cut the measured charge dispensed from said measuring cylinder said means operable by said reciprocating ram.

16. In an apparatus of the type described in claim 13 including adjustment means to vary the position of said valve when opened.

17. In an apparatus of the type described in claim 13 wherein said means for permitting flow of the plasticized mass by said valve element, when the valve element is moved to an open position includes a passage between the wall of said chamber and said valve element.

18. In a plasticizing apparatus for dispensing a measured charge of a plasticized mass comprising in combination a hopper for a supply of granular thermoplastic material, a granular material cylinder connected to said hopper and having a chamber therein, a plasticizing cylinder connected to said granular material cylinder and having a chamber therein where the granular material is formed into the plasticized mass, a measuring cylinder connected to said plasticizing cylinder and having a measuring chamber therein, means to transfer the granular material to said plasticizing and measuring cylinders, valve means in said measuring cylinder responsive to the flow of said plasticized mass to stop the flow of the plasticized mass therefrom when a measured charge has been dispensed, and means operable in timed sequence with said first named means for opening said valve means a predetermined distance from the closed position so that the plasticized mass can fill said measuring chamber.

19. In a plasticizing apparatus for dispensing a measured charge of a plasticized mass comprising in combination a hopper for a supply of granular thermoplastic material, a granular material cylinder connected to said hopper and having a chamber therein, a plasticizing cylinder connected to said granular material cylinder and having a chamber therein where the granular material is formed into the plasticized mass, a measuring cylinder having a measuring chamber therein, said measuring cylinder having an inlet communicating with said plasticizing chamber for delivery of the plasticized mass therefrom and an outlet for dispensing a measured charge of the plasticized mass, a valve seat adjacent the outlet end of said chamber, means for delivering the plasticized mass through said inlet from the chamber of said plasticizing cylinder to said measuring chamber, valve means in said measuring chamber movable in response to the flow of the plasticized mass from a predetermined opened position to seat against said valve seat to close off said outlet after a measured charge of said plasticized mass has been dispensed, said measuring cylinder having a passage communicating with said measuring chamber and extending from a position forward of the open position of said valve means to a position adjacent the valve seat in said chamber, and means operable in timed sequence with said plasticized mass delivering means for opening said valve means a predetermined distance so that the plasticized mass can flow through said passage and fill said chamber.

20. In a plasticizing apparatus for dispensing a measured charge of a plasticized mass comprising in combination a hopper for a supply of granular thermoplastic material, a granular material cylinder connected to said hopper and having a chamber therein, a plasticizing cylinder connected to said granular material cylinder and having a chamber therein where the granular material is formed into the plasticized mass, a measuring cylinder having a longitudinal bore therein defining a measuring chamber, one end of said bore providing an inlet for delivery of the plasticized mass to the measuring chamber from the chamber in said plasticizing cylinder and the other end of said bore providing an outlet for dispensing a measured charge of said plasticized mass, a valve seat adjacent the outlet of said bore, a valve element reciprocal in said bore in a confined path defined by said bore, said valve element movable to a closed position on said valve seat by the flow of the plasticized mass into said measuring chamber, said bore having at least one longitudinal groove in its wall extending from a position forward of the open position of said valve element to a position adjacent the valve seat, means for delivering the plasticized mass from the chamber of the plasticizing cylinder through the inlet to said measuring chamber, said means causing said valve element to move from an open position to a closed position against said valve seat thereby forcing the plasticized mass already in said measuring chamber out of said outlet, a pin element reciprocating into said bore and engaging said valve element to unseat the same and move it a predetermined distance from said seat whereby the plasticized mass can flow through said groove to fill said measuring chamber, said pin element being operable in timed sequence with said plasticizing mass delivering meas.

References Cited in the file of this patent

UNITED STATES PATENTS

| | | |
|---|---|---|
| 901,277 | Bourne | Oct. 13, 1908 |
| 999,608 | Stucky | Aug. 1, 1911 |
| 1,221,178 | Himes | Apr. 3, 1917 |
| 1,374,308 | MacIsaac | Apr. 12, 1921 |
| 1,538,404 | Laird | May 19, 1925 |
| 1,603,357 | Replogle | Oct. 19, 1926 |
| 2,345,917 | Coffman | Apr. 4, 1944 |
| 2,358,956 | Ashbaugh | Sept. 26, 1944 |
| 2,501,595 | Bohannon | Mar. 21, 1950 |
| 2,616,130 | Banz | Nov. 4, 1952 |